United States Patent [19]

Binder

[11] Patent Number: 4,726,925
[45] Date of Patent: Feb. 23, 1988

[54] MOLDING OF ELONGATE PLASTIC CYLINDERS

[76] Inventor: Frederick Binder, 2930 College Avenue, Windsor, Ontario, Canada, N9C 1S5

[21] Appl. No.: 903,823

[22] Filed: Sep. 3, 1986

Related U.S. Application Data

[63] Continuation of Ser. No. 659,165, Oct. 9, 1984, abandoned.

[51] Int. Cl.⁴ ............................................. B29C 45/27
[52] U.S. Cl. ................................ 264/328.12; 425/556; 425/573
[58] Field of Search ............... 264/328.1, 328.12, 536; 425/542, 554, 556, 190, 573

[56] References Cited

U.S. PATENT DOCUMENTS

| | | | |
|---|---|---|---|
| 2,330,369 | 9/1943 | Marsh | 425/554 |
| 2,453,739 | 11/1948 | Bates | 264/275 |
| 2,799,435 | 7/1957 | Abplanalp | 222/402.1 |
| 3,211,347 | 10/1965 | Phillips | 222/572 |
| 3,310,621 | 3/1967 | Valvi | 264/536 |
| 3,572,424 | 3/1971 | Byrne | 425/556 |
| 4,017,582 | 4/1977 | Naumann | 264/291 |
| 4,069,091 | 1/1978 | van Manen | 156/498 |
| 4,111,622 | 9/1978 | Sutch | 425/542 |
| 4,277,435 | 7/1981 | Allen | 264/328.12 |
| 4,289,726 | 9/1981 | Potoczky | 264/318 |

FOREIGN PATENT DOCUMENTS

| | | | |
|---|---|---|---|
| 53427 | 3/1983 | Japan | 264/328.12 |
| 410374 | 10/1966 | Switzerland | 425/542 |

*Primary Examiner*—Jay H. Woo
*Assistant Examiner*—Timothy W. Heitbrink
*Attorney, Agent, or Firm*—Ridout & Maybee

[57] ABSTRACT

An elongate plastic cylindrical product is molded in one piece including a nozzle extending from an end wall, the flow of plastic being achieved by injecting plastic adjacent the desired end wall so that the plastic flows in one direction to form a cylindrical portion and in another direction to form the end wall and nozzle.

16 Claims, 6 Drawing Figures

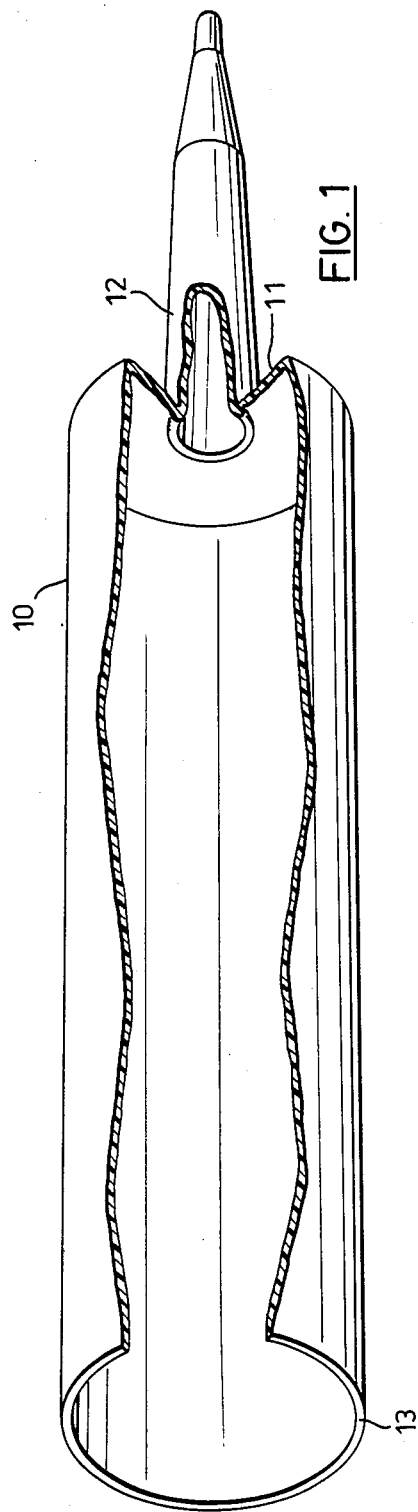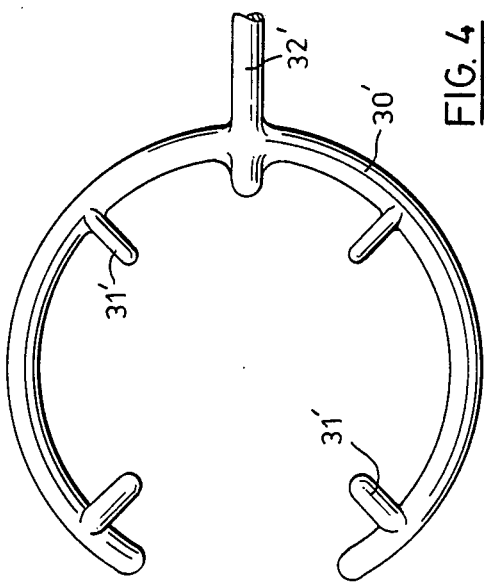

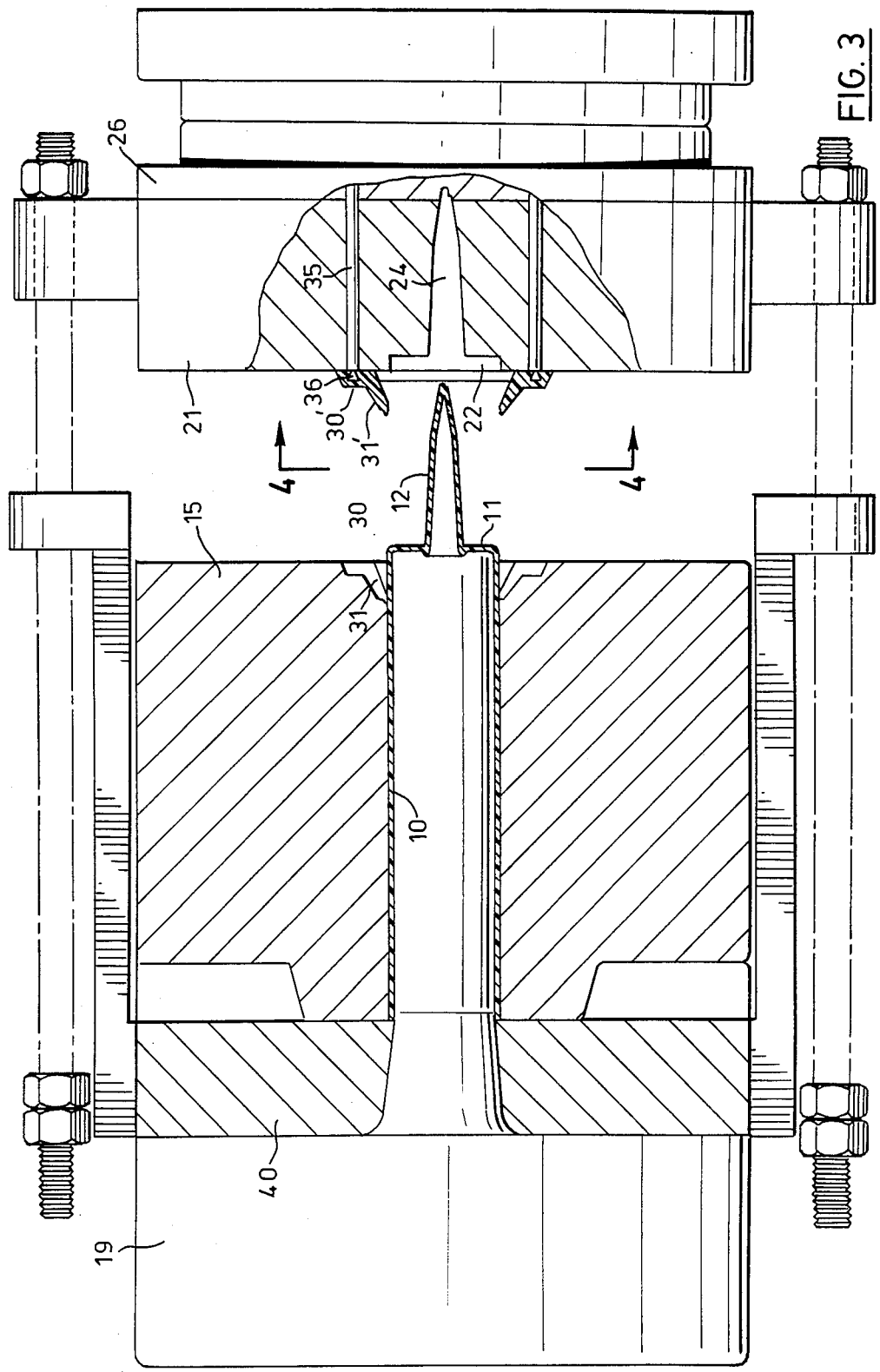

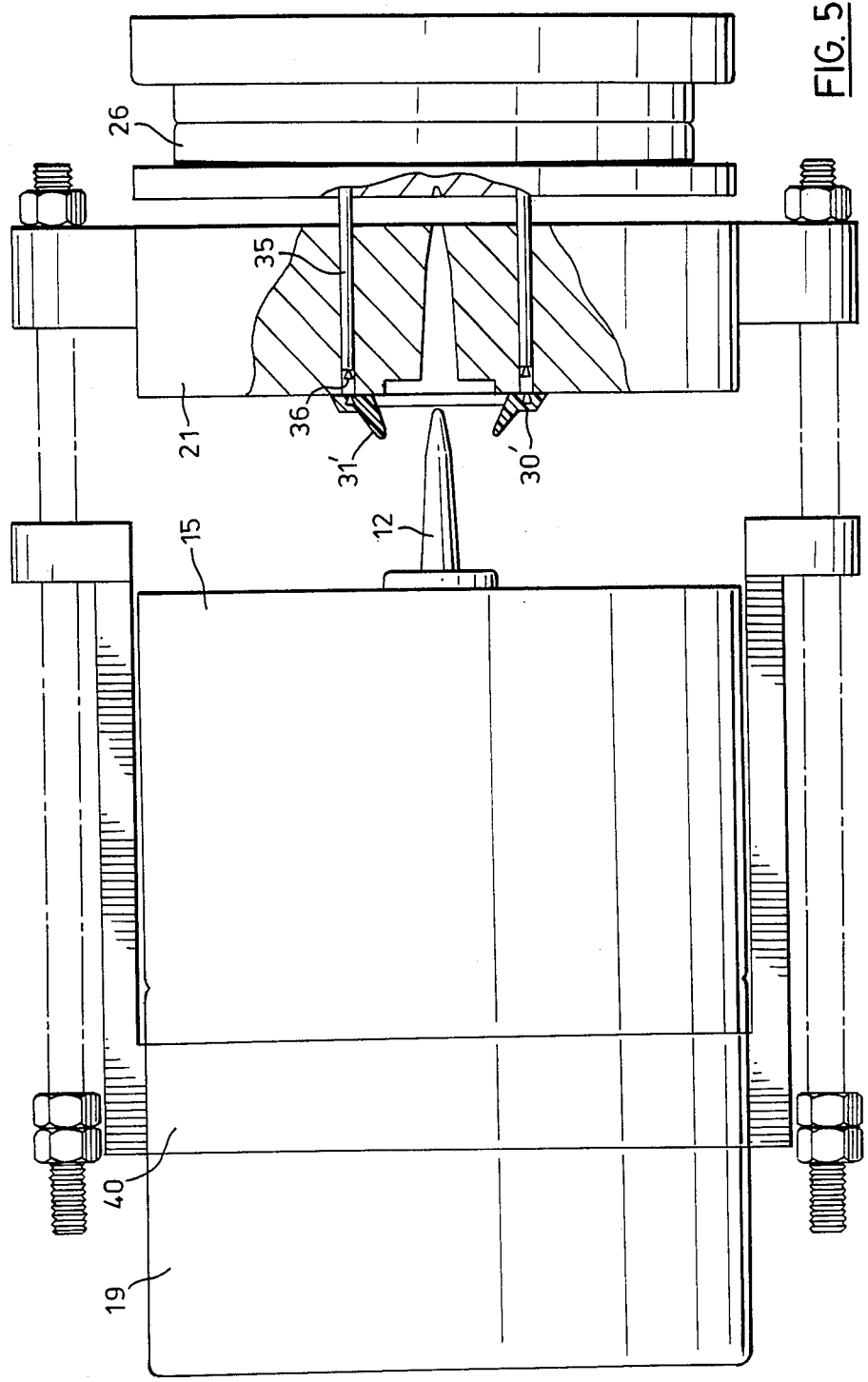

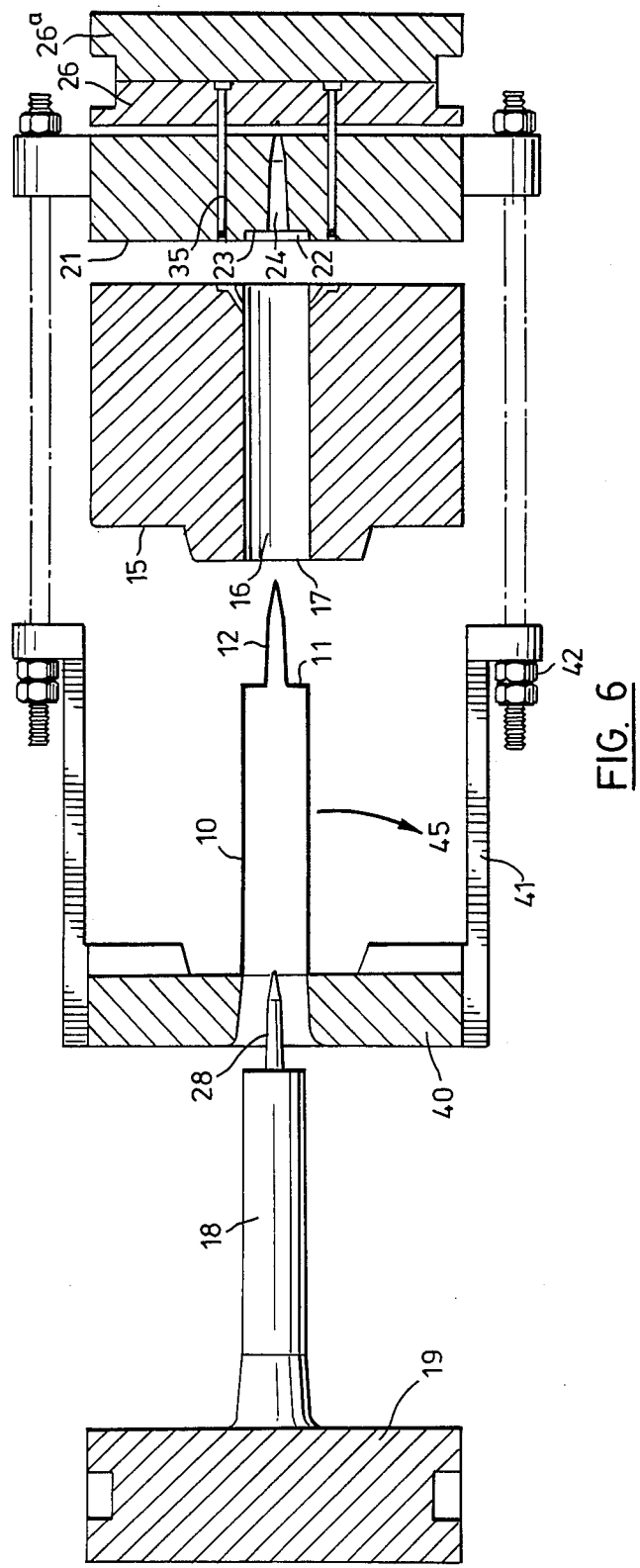

MOLDING OF ELONGATE PLASTIC CYLINDERS

This application is a continuation of application Ser. No. 659,165, filed Oct. 9, 1984, now abandoned.

BACKGROUND OF THE INVENTION

1. Field of the Invention

This invention relates to the molding of one-piece cylindrical plastic bodies that are elongate and, when being molded, require plastic to flow along a nonlinear path at one end. The invention is more particularly concerned with the molding of a cylinder for containing sealants or the like that are to be discharged from a nozzle at one end of the cylinder.

2. Description of the Related Art

Cylinders for containing and dispensing sealants, such as caulking materials, have often been made from hollow tubes, closed at one end by a separate piece that is attached to the tube by spin welding or the like, the closure piece having a nozzle for discharging the contents of the cylinder. Relatively short cylinders having an integral end wall and nozzle can be molded by injecting plastic into a mold from one or the other end of the desired product, but where the plastic is required to flow in a nonlinear path, e.g., to form an end wall, it may be necessary to use a relatively high pressure to force the plastic to flow (with possible consequent mold deflection or distortion), or to have relatively large passageways for plastic flow, with waste of plastic and the production of products of excessive wall thickness.

SUMMARY OF THE INVENTION

In accordance with the present invention, elongate cylinders having end walls and nozzles can be molded with relatively thin walls, at moderate pressures, by injecting plastic into a mold at a location between the ends of the desired product, adjacent where the plastic is required to flow in a nonlinear path. A mold is formed with a female mold structure having an entrance which receives a male mold member, and the plastic is injected through gates in the female mold structure, the gates preferably being located around the male mold member. When molding is completed, parts of the female mold structure can be separated to withdraw and discard waste plastic that remains in the gates, and the finished product can be stripped off the male mold member.

BRIEF DESCRIPTION OF THE DRAWINGS

Reference will be made to the accompanying drawings which illustrate by way of example a preferred embodiment of the invention. In the drawings:

FIG. 1 is a partly cut away perspective view of a cylindrical product molded in accordance with the invention;

FIG. 3 is a partly sectional view similar to FIG. 2 but with parts of the female mold structure separated in a first stage of removing the molded plastic material from the mold;

FIG. 4 is a view taken at 4—4 in FIG. 3, but on an enlarged scale, showing waste plastic formed in the runners and gates of the female mold structure, and thereby illustrating the configuration of the runners and gates;

FIG. 5 is a partly sectional view similar to FIG. 3 but with the female mold parts fully separated for removal of the waste plastic of FIG. 4; and FIG. 6 is a longitudinal sectional view, on a reduced scale from FIG. 5, showing all the mold parts completely separated for removal of the cylindrical product.

DESCRIPTION OF THE PREFERRED EMBODIMENT

Figure 2:
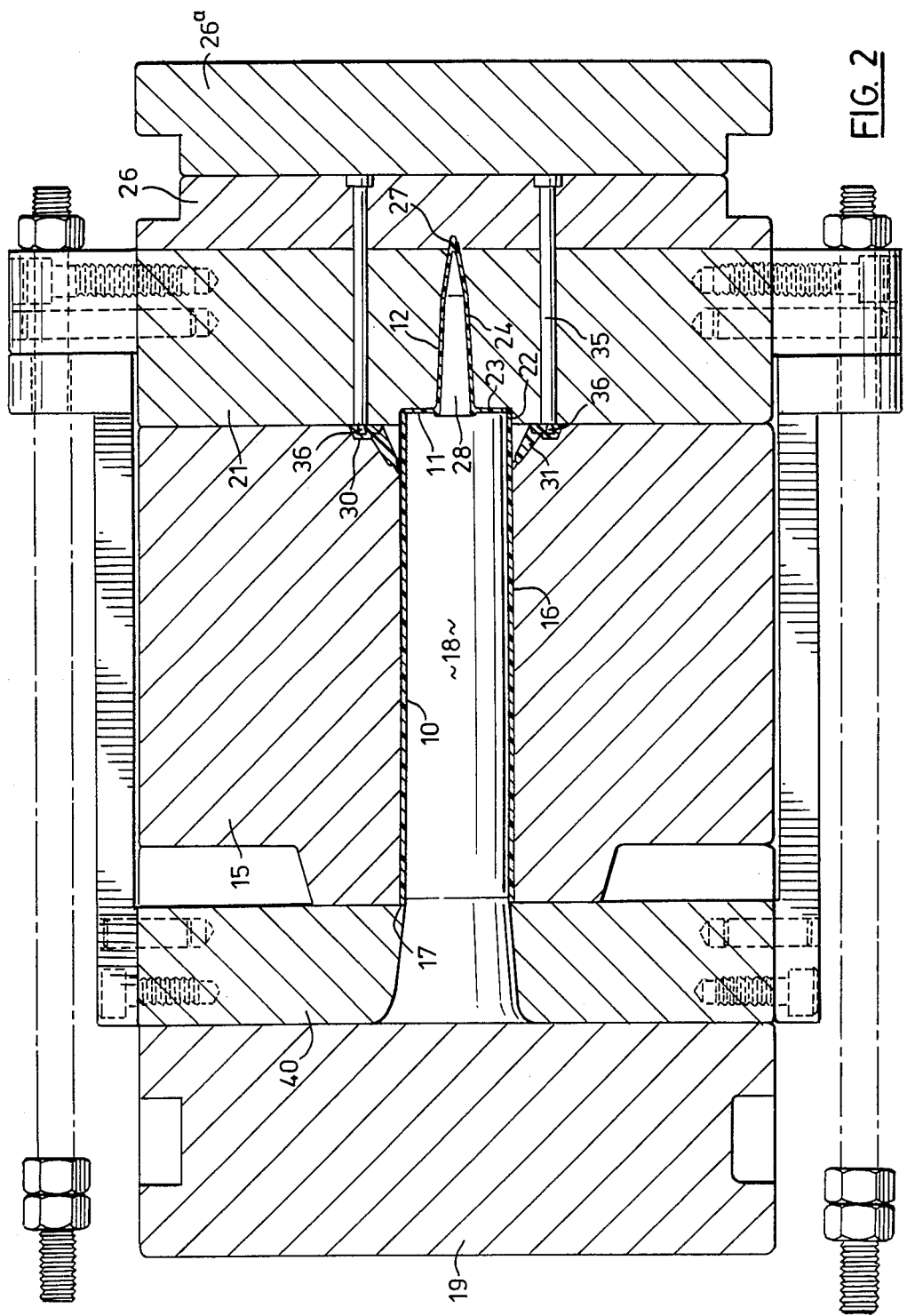
FIG. 2 is a longitudinal sectional view, on a reduced scale, of the product in the mold when molding has been completed, the mold being shown schematically to illustrate only what is necessary for an understanding of the invention.

The elongate cylindrical product of FIG. 1 has a main cylindrical body 10 of circular cross-section, an end wall 11 partially closing one end of the body 10, and a nozzle 12 that communicates with the interior of the body 10 through the end wall 11. The body 10 has an open end 13 through which it can be filled with a fluid material to be dispensed through the nozzle by inserting a piston (not shown) through this open end. To dispense caulking and other materials it is convenient to have a long nozzle of small cross-sectional area, and to have a body 10 that is also long, to hold a substantial amount of the material. However, it has been difficult to mold such a product in one piece of plastic, because plastic flowing generally longitudinally must travel nonlinearly, around corners, to form the end wall.

FIG. 2 illustrates a molding apparatus that has been devised to produce a one piece molded product such as that of FIG. 1, preferably of polypropylene. A first female mold member 15 has a circular cylindrical cavity 16 extending inwardly from an entrance 17 (as best seen in FIG. 6) for receiving a male mold member 18. The male member 18 extends as a rigid cantilever from a support 19 that can be shifted to move the member 18 into and out of the female mold structure. A second female mold member 21, when abutted against member 15 as shown in FIG. 2, provides a continuation 22 of the circular cylindrical cavity 16, with an end wall 23 corresponding to the end wall 11 of the desired product, the wall 23 being pierced by a further continuation 24 of the cavity corresponding to the configuration of the desired nozzle 12. A third component 26 of the female mold structure has a small recess 27 in which the tip of the nozzle is formed, this tip of course being later removed from the product when the nozzle is to be used. The male mold member 18 has a projection 28 corresponding in shape to the interior of the nozzle 12. The male member has a shape corresponding to that of the interior of the desired product, and the female mold structure provides a cavity 16, 22, 24 that is shaped to define the exterior of the product.

Between the abutted female mold members 15, 21 there is a runner manifold 30 formed by a partly circular recess in the member 15. From this manifold 30 run four gates 31, formed in the female mold member 15 and running to the cavity 16. The configurations of the manifold 30 and gates 31 correspond to the configuration of waste plastic ultimately molded therein, as seen enlarged in FIG. 4, where the waste plastic shapes 30' and 31' correspond to the manifold 30 and gates 31. FIG. 4 also shows a waste plastic shape 32' which corresponds to that of a supply runner (not shown) for the manifold 30.

To mold the desired product, the mold is closed as shown in FIG. 2 and plastic is fed from the manifold 30 through the gates 31 into the clearance space between the male mold member and the female mold structure.

From the gates 31 the plastic can flow longitudinally of the male mold member 18 towards the (now closed) entrance 17, and it can flow in the opposite direction into the cavity extensions 22 and 24. This flow in the opposite direction is nonlinear, as viewed in FIG. 2, because it is necessary for the plastic to change direction as it moves along the cavity 16 into the part of the clearance space where the end wall 11 is to be formed and thence into the nozzle forming space. This nonlinear portion of the clearance space within the mold is remote from the entrance 17 to the mold. If the plastic were to be injected into the mold adjacent the entrance 17, undesirably high pressure could be required to force the plastic to flow all the way to the tip recess 27. Further, high pressure may cause a cantilevered mold member 18 to deflect, resulting in uneven wall thickness in the resultant product. If the clearance space between the mold members were to be increased to facilitate the flow, more plastic would be consumed, and a product of unnecessary wall thickness would result. Similar problems may arise by injecting plastic from the tip end 27. However, lower pressure can be used with the arrangement shown, where the gates 31 are remote from the entrance 17 and are adjacent (i.e. at or near) the nonlinear clearance space defined between the male mold member 18 and the second female mold member 21. With a plurality of gates feeding into the cylindrical portion of the clearance space, and disposed uniformly around the free end of the male mold member 18, there should be no tendency for the latter to deflect.

When the first and second female mold members 15 and 21 are together, pins 35 have heads 36 which protrude into the manifold 30, to be embedded in plastic therein as the plastic sets in the mold. The pins 15 are fixed in the mold component 26 by a cover section 26a thereof, but the pins are slidable through the mold member 21. When the molding is completed, the female mold member 21 and component 26 are separated from the female member 15, as shown in FIG. 3. This forces the plastic 31' in the gates 31 to break away from the product formed in the mold, and the waste plastic 31' deflects outwardly as it is pulled out of the gates by the pin heads 36 embedded in the waste plastic 30' from the manifold 30.

To release the waste plastic, the mold component 26 is now separated from the mold member 21, as shown in FIG. 5, thereby withdrawing the heads 36 of the pins 35 out of the waste plastic, which will drop or can be brushed out of the mold.

To remove the desired product from the mold, the male support 19 is drawn away from the female mold member 15, thus withdrawing the male mold member through and out of the cavity 16 and carrying the body 10 with it. A mold stripper 40 travels with the male member and the product until the product is fully withdrawn, but then, as shown in FIG. 6, arms 41 on the stripper encounter abutments 42, arresting movement of the stripper so that as the male mold member continues to retract the product is stripped off the male member and drops out of the mold, as indicated by the arrow 45.

Modifications within the spirit of the invention will of course occur to those skilled in the art and are intended to be covered by the following claims.

What is claimed is:

1. A method of molding in one piece an elongate cylindrical hollow body having walls of substantially uniform thickness including a cylindrical wall and an end wall formed with a nozzle, comprising the step of injecting plastic into a mold through a plurality of gates spaced from either end of the mold and uniformly around the mold intermediate its ends and adjacent to the end wall to be formed in order to achieve plastic flow in one direction to form the end wall and nozzle of the body, and simultaneously in a different direction entirely lengthwise of the mold without overlap.

2. A method of molding in one piece an elongate cylindrical body including an end nozzle, having walls of generally uniform thickness including an end wall comprising said nozzle, and a cylindrical side wall, said end wall being joined substantially in transverse to an end of said cylindrical wall, comprising the steps of:
    inserting a male mold structure into a female mold structure having a cavity extending from an entrance to thereby form a clearance space between the female mold structure and the male mold structure, said clearance space providing a linear flow portion for forming said cylindrical side wall and a nonlinear portion for forming said end wall joined substantially in transverse to said cylindrical side wall; and
    injecting plastic into said linear flow portion in an area intermediate the ends of said linear flow portion and in close proximity to said nonlinear flow portion to supply plastic in one direction towards said nonlinear flow portion and in a generally opposite direction toward said female mold cavity entrance.

3. A method as recited in claim 2 wherein said injecting step further includes the step of injecting plastic through a plurality of gates spaced uniformly around the linear portion of said clearance space.

4. A method as recited in claim 2 wherein said inserting step further comprises the step of forming said clearance space such that said linear flow portion separates all of said nonlinear flow portion from said female mold cavity entrance.

5. A method as recited in claim 3 wherein said inserting step further comprises the step of forming said clearance space such that said linear flow portion separates all of said nonlinear flow portion from said female mold cavity entrance.

6. Apparatus for molding in one piece an elongate cylindrical hollow body having walls of substantially uniform thickness, requiring a linear and a nonlinear flow of plastic material to mold the cylindrical body, comprising a female mold structure providing a cavity that is shaped to define the exterior of said body, and extending inwardly from an entrance, a male mold member insertable into the cavity through said entrance and providing a clearance space of substantially uniform thickness between the male mold member and the female mold structure to define said body, said clearance space including a portion for said nonlinear plastic flow remote from said entrance, and a portion for said linear plastic flow, and means disposed intermediate the ends of said linear flow portion for injecting plastic material into said linear flow portion in an area adjacent said nonlinear flow portion of the clearance space to fill the clearance space, said injecting means supplying plastic into said clearance space in one direction towards the female mold cavity entrance and in a generally opposite direction to said nonlinear flow portion without causing substantial deflection of the male mold member.

7. An apparatus as recited in claim 6, wherein said injecting means comprises a plurality of gates in the female mold structure spaced uniformly around the female mold cavity.

8. An apparatus as recited in claim 7, wherein all of said nonlinear flow portion is separated from said female mold cavity entrance by said linear flow portion.

9. Apparatus as claimed in claim 7, wherein said nonlinear flow portion comprises an end wall forming portion for the cylindrical body and communicating with a nozzle forming portion extending inwardly of the female mold structure from said end wall forming portion.

10. Apparatus as claimed in claim 9, wherein said gates lead into the cavity in a cylindrical portion thereof, around the male mold member near said end wall forming portion.

11. Apparatus as claimed in claim 10, wherein the female mold structure comprises a first mold member defining said cylindrical portion and containing the gates, and a second mold member defining the nonlinear flow portion, the first and second mold members defining between them a runner manifold for supplying plastic to the gates.

12. Apparatus as claimed in claim 11, wherein the first and second mold members are separable, the second mold member having pins which, when the first and second mold members are not separated, have heads protruding into the manifold to be embedded in plastic therein, the heads when the first and second mold members are separated, after molding, drawing with them waste plastic from the manifold and from the gates.

13. Apparatus as claimed in claim 12, including means for pulling the pins out of the waste plastic to discard the latter.

14. Apparatus as claimed in claim 13, including means for retracting the male mold member from the cavity and for stripping from the male mold member the molded elongate body.

15. Apparatus for molding in one piece an elongate cylindrical hollow body requiring a nonlinear flow of plastic material at one end of the cylindrical body, comprising female mold structure providing a cavity that is shaped to define the exterior of said body, the cavity extending inwardly from an entrance, a male mold member insertable into the entrance and providing a clearance space between the male mold member and the female mold structure to define said body, said clearance space including a portion for said nonlinear plastic flow remote from said entrance, and means for injecting plastic material into the cavity at a location along a cylindrical portion of said clearance space and adjacent and nonlinear flow portion of the clearance space such that, upon entering the clearance space, some of the plastic material flows in a first direction lengthwise of said cylindrical body towards said entrance and the remainder of the material flow in a different direction towards said nonlinear flow portion.

16. The apparatus of claim 15 wherein said different direction is substantially opposite to said first direction.

* * * * *